US007092088B2

United States Patent
Schau

(10) Patent No.: US 7,092,088 B2
(45) Date of Patent: Aug. 15, 2006

(54) FIELD MULTIPLEXED DISPERSIVE IMAGING SPECTROMETER

(75) Inventor: Harvey C. Schau, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 122 days.

(21) Appl. No.: 10/313,471

(22) Filed: Dec. 4, 2002

(65) Prior Publication Data

US 2004/0109159 A1 Jun. 10, 2004

(51) Int. Cl.
*G01J 3/28* (2006.01)
(52) U.S. Cl. ........................ 356/328; 356/334
(58) Field of Classification Search ............... 356/334, 356/326–328; 359/32, 568
See application file for complete search history.

(56) References Cited

U.S. PATENT DOCUMENTS

| | | | | |
|---|---|---|---|---|
| 5,139,335 A | * | 8/1992 | Lundeen et al. | 356/328 |
| 5,504,576 A | * | 4/1996 | Ohle et al. | 356/334 |
| 5,880,834 A | * | 3/1999 | Chrisp | 356/328 |
| 5,926,282 A | | 7/1999 | Hopkins | |
| 6,104,488 A | * | 8/2000 | LeVan | 356/328 |
| 6,522,403 B1 | * | 2/2003 | Wilson et al. | 356/328 |
| 2003/0223059 A1 | * | 12/2003 | Li | 356/317 |

OTHER PUBLICATIONS

Descour et al., "Demonstration of a computed-tomography imaging spectrometer using a computer-generated hologram disperser", Jun. 1, 1997, Applied Optics (USA) vol. 36, No. 16, pp. 3694-3698.*
Schau et al., "Restoration Target Recognition, and Countermeasure Removal using the Computed Tomographic Imaging Spectrometer (CTIS)", Apr. 1, 2002, Algorithms and Technologies for Multispectral, Hyperspectral, and Ultraspectral Imagery VIII, vol. 4725.*
M. Descour et al: "Demonstration oif a computed-tomography imaging spectrometer using a computer-generated hologram disperser"; Applied Optics, vol. 36, No. 16, Jun. 1, 1997, pp. 3694-3698, XP002309633, New York (the whole document).

* cited by examiner

*Primary Examiner*—Layla G. Lauchman
*Assistant Examiner*—Kara Geisel

(57) ABSTRACT

A field multiplexed dispersive imaging spectrometer (20). The novel system includes foreoptics (22) for receiving incoming electromagnetic energy, a disperser (24) disposed to receive energy from the foreoptics (22), and a focal plane array (28) disposed to receive energy from the disperser (24). The disperser (24) is a computer generated holographic disperser designed to disperse light into several, overlapping diffraction orders. In the preferred embodiment, the disperser (24) is designed with greater energy in the central, undiffracted order than in the other diffracted orders. The system (20) also includes a processor (30) which takes the data detected by the focal plane array (28) and generates a representation of the input image in several color bands using an iterative restoration algorithm (32).

17 Claims, 6 Drawing Sheets

FIELD MULTIPLEXED DISPERSIVE IMAGING SPECTROMETER

BACKGROUND OF THE INVENTION

1. Field of the Invention

The present invention relates to imaging systems. More specifically, the present invention relates to imaging spectrometers.

2. Description of the Related Art

Military seekers have evolved and become increasingly more complex. Twenty-five years ago, seekers were only concerned with the intensity of a target. Today there are imaging seekers which take into consideration the total image of the target, as well as its spectral signature. Current one-color imaging systems do not provide enough information to make unique identification of items within the field of regard. These imagers can provide the spectral signature of a target as a whole, but not the spectral distribution of each and every pixel in the image.

Many attempts to field a multi-spectral imager have been made, some more successful than others. One successful prior art imager is the computer tomographic imaging spectrometer (CTIS). Developed in the mid 90's, the CTIS does not utilize spatial scanning such as commonly found in pushbroom types of instruments, nor does it employ interferometric scanning such as found in Fourier-transform spectrometers which are employed as imaging devices by utilizing a focal plane array (FPA) in the focal plane. The CTIS achieves true flash spectral imaging by aperture-coding spectral and spatial information onto the FPA using a computer-generated holographic (CGH) disperser. Restoration of the measured data is necessarily performed after the data is collected so that there is a required time delay between capture of the $(x_f, y_f)$ focal plane data, and generation of the true $(x, y, \lambda)$ object cube.

While the CTIS solved the problem of providing imagery in many spectral bands, it had several limitations. First, it demonstrated inefficient use of the focal plane, providing images in small numbers of pixels. A 1024×1024 pixel focal plane yielded only an 80×80 pixel image in 108 color bands. Second, the CTIS had poor signal to noise ratio (SNR) caused by the design which required all diffraction orders to not overlap thus presenting low intensity to each pixel. Third, it had high instrument self-radiance caused by the CTIS design which employed an intermediate focal plane with collimation stage. Furthermore, the CTIS showed very poor performance in the infrared spectrum, and the mechanical layout resulted in a device which was too large for many applications. Plus, the technology could not be retrofit into existing sensor packages.

Hence, a need exists in the art for an improved system or method for obtaining multi-spectral image measurements which offers better infrared performance than the prior art and is of size and cost suitable for use in military seeker applications.

SUMMARY OF THE INVENTION

The need in the art is addressed by the field multiplexed dispersive imaging spectrometer of the present invention. In the illustrative embodiment, the novel system includes foreoptics for receiving incoming electromagnetic energy, a disperser disposed to receive energy from the foreoptics, and a focal plane array disposed to receive energy from the disperser. The disperser is a computer generated holographic disperser designed to disperse light into several, overlapping diffraction orders. In the preferred embodiment, the disperser is designed with greater energy in the central, undiffracted order than in the other diffracted orders. The system also includes a processor which takes the data detected by the focal plane array and generates a representation of the input image in several color bands using an iterative restoration algorithm.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
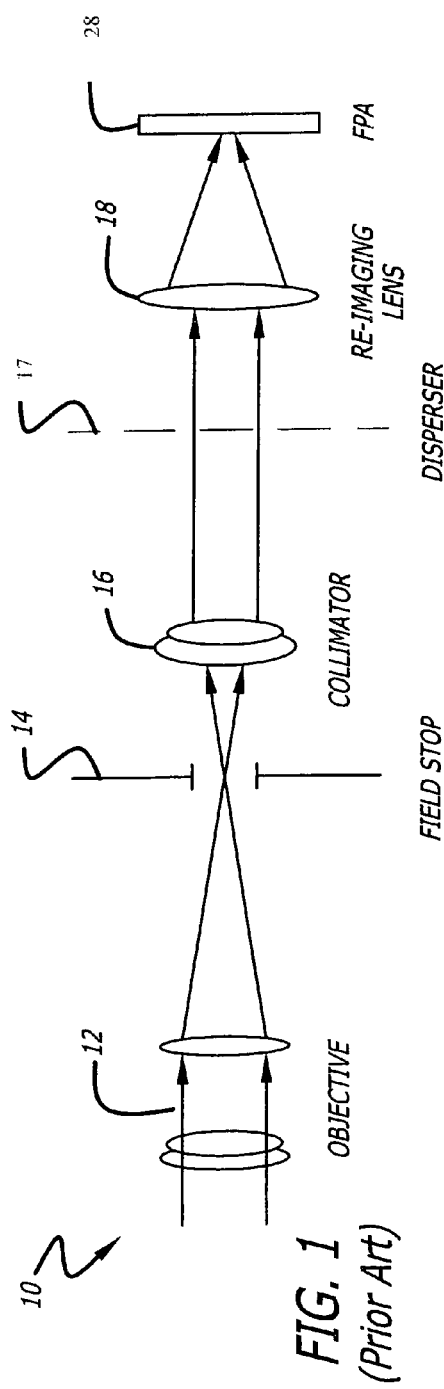
FIG. 1 is a diagram of a CTIS instrument of conventional design and construction.

FIG. 1 is a diagram of a CTIS instrument 10 of conventional design and construction. Foreoptics 12 pass light through an aperture 14 to a collimator 16 and re-imaging lens 18, and onto a focal plane array (FPA) detector 28. A computer-generated holographic (CGH) disperser 17 is placed within the collimation stage between the collimator 16 and the re-imaging lens 18. Note the use of an aperture and the placement of the CGH disperser within a collimation stage. This should be contrasted with FIG. 2, a diagram for the present invention.

Figure 2:
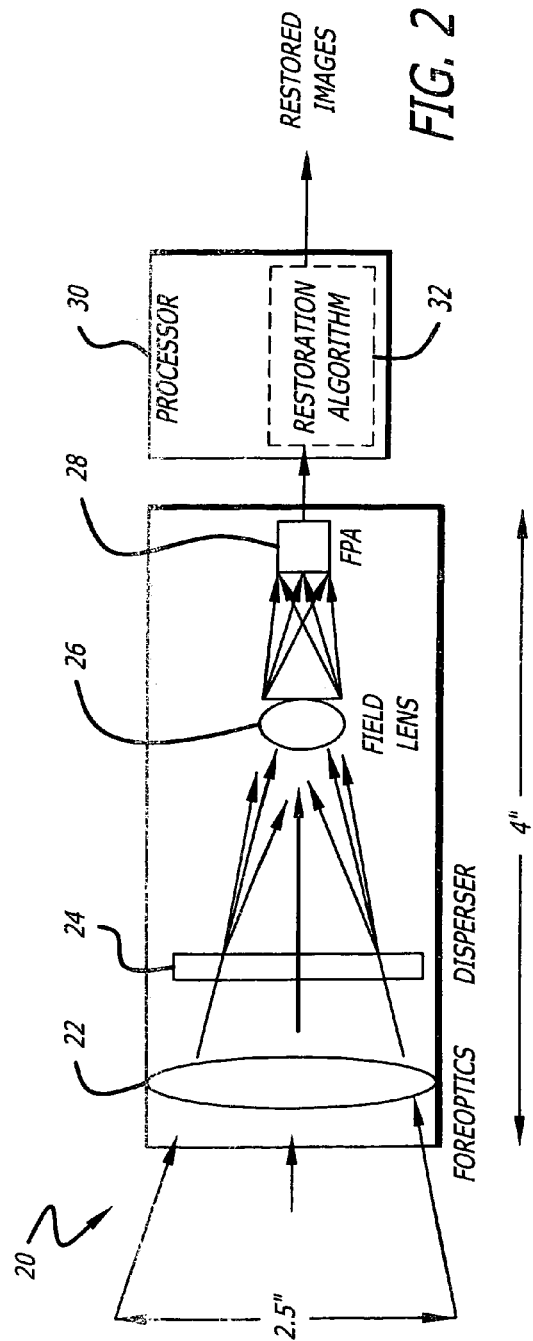
FIG. 2 is a diagram of an illustrative embodiment of the present invention, a field multiplexed dispersive imaging spectrometer (FMDIS).

FIG. 2 is a diagram of an illustrative embodiment of the present invention 20, a field multiplexed dispersive imaging spectrometer (FMDIS). Foreoptics 22 direct light through a CGH disperser 24 onto a FPA 28. A processor 30 receives data from the FPA 28 and generates a representation of the original image in several color bands using a restoration algorithm 32. An optional field lens 26 may be included between the disperser 24 and the FPA 28 if necessary to get the geometries correct. A custom-designed instrument would not require a field lens 26.

Both the FMDIS of the present invention and the CTIS of the prior art use the same type of disperser although the properties of each CGH will likely be different. Both systems use similar foreoptics and FPA's. The chief difference is the simplification of the overall design in the FMDIS by removing both the aperture stop and the collimation stage. The inclusion of an aperture stop in the prior art CTIS made the diffraction orders produced by the disperser independent, resulting in very poor efficiency. In the FMDIS of the present invention, the diffraction orders are allowed to overlap. It should be noted that based on published articles describing the theory and restoration of the CTIS, the FMDIS would not work and cannot be restored because the system of equation is many times underdetermined.

The disperser 24 is a computer generated holographic transmission type grating which disperses light into several diffraction orders. In the illustrative embodiment, the CGH disperser for the visible spectrum produces 7×7 diffraction orders on a 1024×1024 pixel FPA. The disperser is a phase grating with individual pixel size of 16 by 16 micrometers with 10 pixel by 10 pixel cells. The cell addressing is symmetric about the main diagonal. The cells are replicated over the 17 mm by 17 mm disperser size. The substrate is polymethyl methacrylate (PMMA). An infrared CGH disperser was also constructed on a gallium arsenide (GaAs) substrate with 5×5 diffraction orders.

Conventional CGH design attempts to place equal energies in each diffraction order. This, however, is not optimal for the FMDIS instrument. In accordance with the teachings of the present invention, the CGH disperser should be designed with greater energy in the central, undiffracted order than in the other diffracted orders. For FMDIS application, simulations have shown that the orders have an effect on accuracy tradeoff between spectral and spatial resolution. In the illustrative embodiment, the central order has 2–3 times more energy than the diffracted orders.

In an alternative embodiment, a conventional CGH disperser with equal energy in each order can be used in the FMDIS by placing the CGH so that a portion of the optical beam misses the disperser, thus resulting in an undiffracted order which contains appreciably more energy than the other diffracted orders.

The CGH disperser can be constructed using conventional multilithrography techniques. The CGH etch pattern can be calculated by standard techniques such as the SPIDER 3.0 code.

Figure 3A:
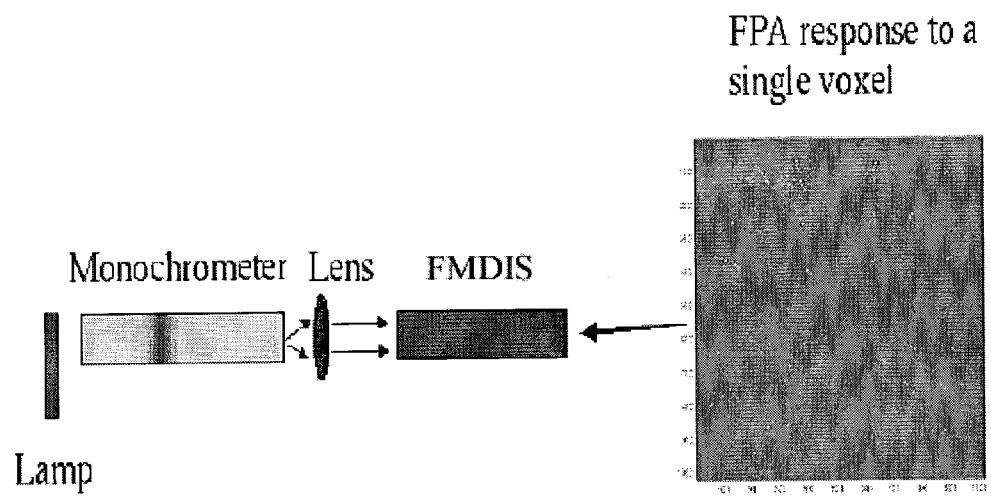
FIGS. 3a–3c are illustrations showing how to obtain the system matrix experimentally.
Figure 3B:
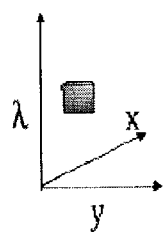
Figure 3C:
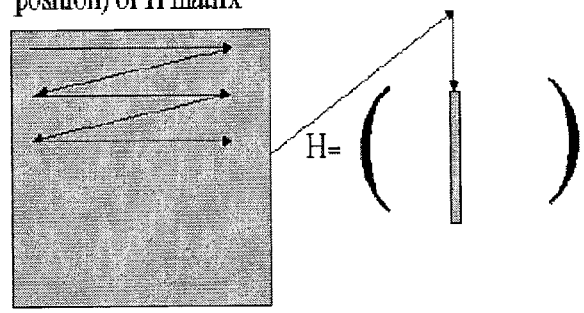

Before these types of multiplexed instruments can be employed, a system characterization matrix H must be obtained. The system matrix H can be determined experimentally or theoretically. FIGS. 3a–3c illustrate how to obtain the system matrix experimentally. As shown in FIGS. 3a and 3b, a monochrometer provides a single voxel input to the FMDIS, generating an FPA response. As shown in FIG. 3c, the data from the FPA is scanned to provide one column (single color, single spatial position) of the H matrix. To paraphrase the figures, to characterize the instrument, one presents it with a series of objects of known spectral and spatial properties. In this case, simple point sources of a single spectral interval are used. In the infrared case, the 3 to 5 micron region was divided into 25 spectral intervals. The FMDIS instrument was presented with a single pixel monochrometer which had a spectral band centered on each interval with a bandwidth approximately two spectral intervals wide. It is assumed that the spatial pattern the instrument produces is independent of where in the focal plane the source is presented, it merely translates. While not necessary to restore the data cube from the instrument, it provides a simplifying assumption. It should also be pointed out as seen in the figure that the calibration pattern contains mostly zeros. Thus the system matrix is stored and manipulated in sparse format.

Figure 4:
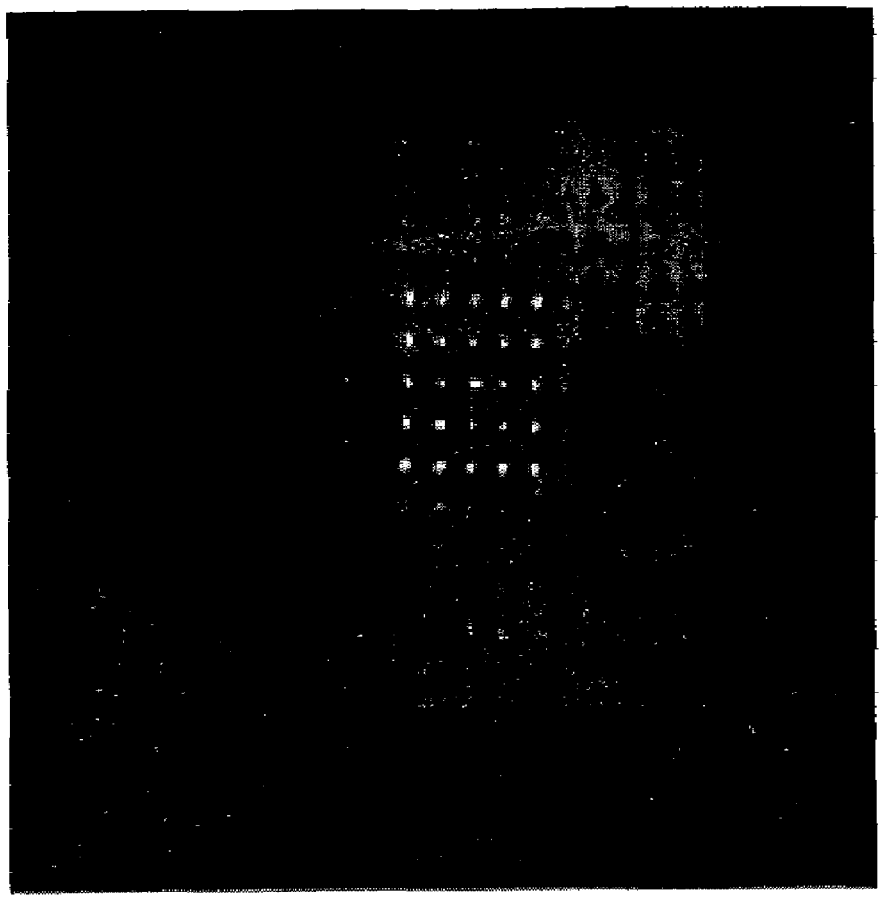
FIG. 4 shows a calibration pattern for the FMDIS to an input at 3.83 microns.

FIG. 4 shows a calibration pattern for the FMDIS to an input at 3.83 microns. Notice the 5×5 diffraction pattern produced by the CGH, and note the central undiffracted pattern appearing brighter than other orders as described earlier. This array is raster-scanned to produce one column of the system or H matrix. Other columns represent different spatial positions of the source within one spectral band, and are assumed to be shifted replicas as stated previously. Thus only one image is required for each spectral interval to obtain the full (sparse) system matrix.

Restoration of these instruments forms the central issue in the operation of the devices. While restoration for CTIS and FMDIS instruments follow similar algorithmic concepts, the motivation is vastly different. Due to the large size of the system matrices it is impossible to show them. Rather they can be made into an image and displayed to provide some insight into their construction.

Figure 5:
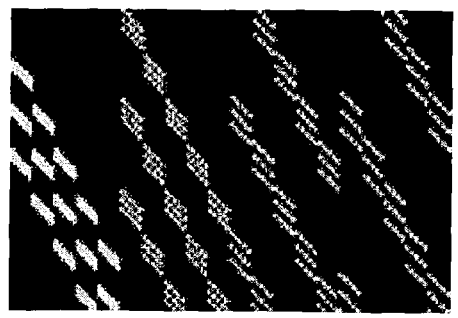
FIG. 5 displays the system matrix for a typical CTIS system.
Figure 6:
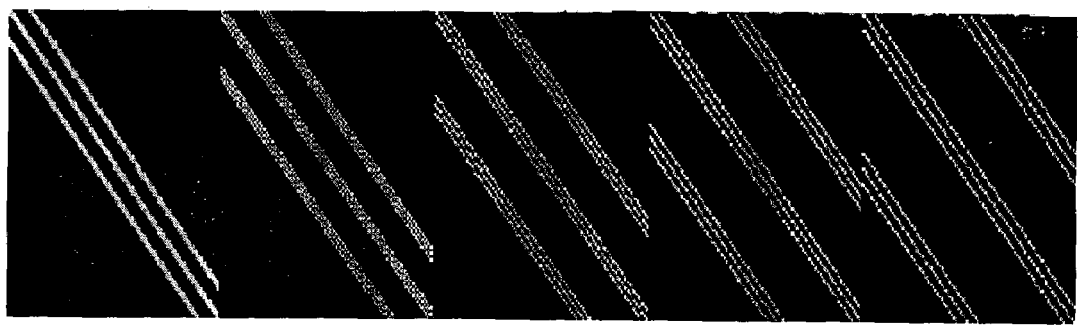
FIG. 6 displays the system matrix for a FMDIS-5 color system.

FIG. 5 displays the system matrix for a typical CTIS system. This is a simple example of 4 colors. Note the close-spaced nature of the bands within each color interval. This is a direct representation of the invertibility of the matrix. Also note that the matrix is square, a condition postulated to be necessary by both CTIS theory and general linear algebra. Contrast this construction with the typical FMDIS-5 color system matrix, shown in FIG. 6. Here the wide gaps in bands are evident indicating poor conditioning and it is easily seen the matrix is far from square.

The general equations describing all CGH based spectral imagers can be written as:

$$g = Hf \quad [1]$$

where f is the input image plane data sampled lexicographically, which represents spatial values of many narrow spectral windows as is common in imaging spectroscopy; H is the system matrix which represents the system response to all possible spatial-spectral combinations and as such represents a basis function for the system; and the vector g represents the measured FPA values (again sampled lexicographically) which are employed to estimate f. It is assumed the system is a linear system and as such permits superposition.

The procedure for solving the system is to form the normal equation where $H^t$ denotes matrix transpose. While not formally necessary if the system is square, the solution only requires that the product be non-singular, a weaker condition than the positive real condition for solving the original equation. Then the equation can be rewritten as:

$$g_a = H^t g \quad [2]$$

$$g_a = Mf \quad [3]$$

where $M = H^t H$. Thus the matrix (square) M determines the solvability of the overall system.

Figure 7:
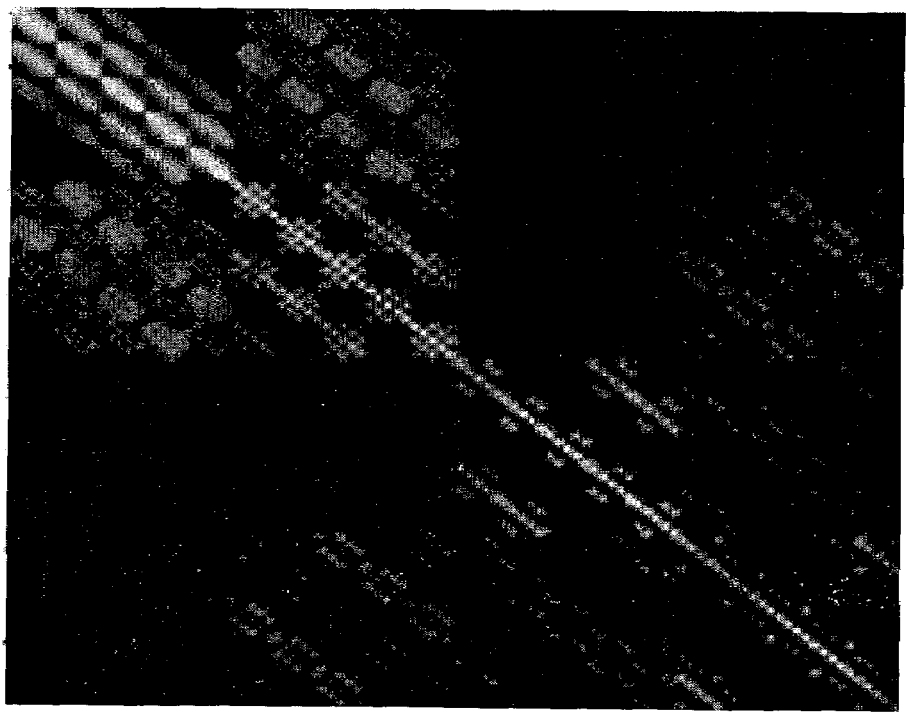
FIG. 7 displays a typical M matrix for the CTIS system shown in FIG. 5.
Figure 8:
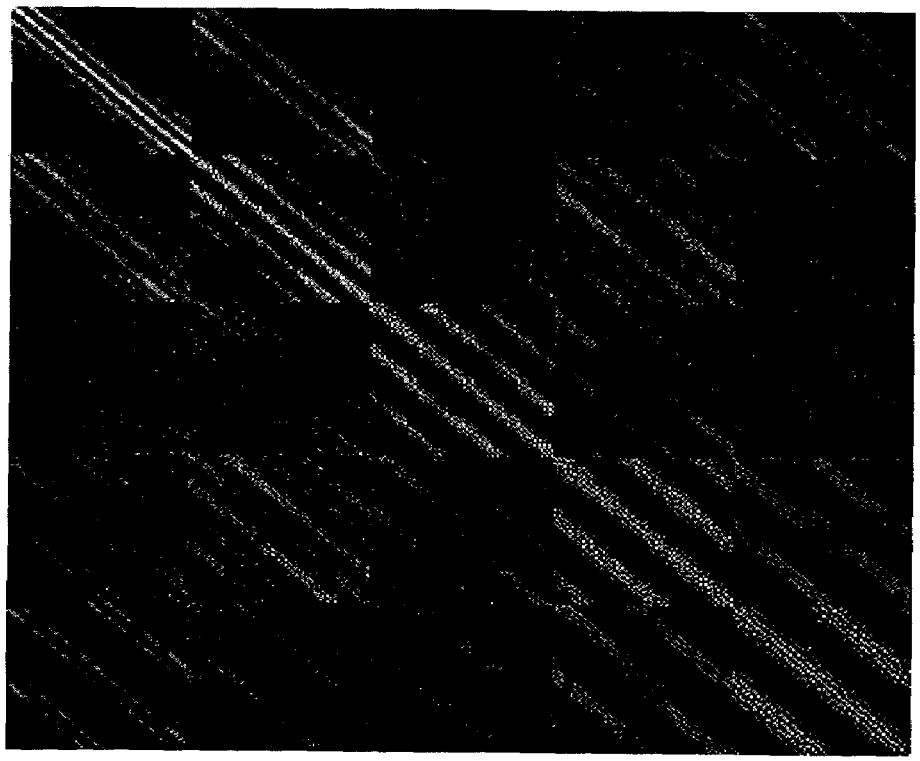
FIG. 8 displays the M matrix for the FMDIS system described in FIG. 6.

FIG. 7 displays a typical M matrix for the CTIS system shown in FIG. 5. Note that it is band diagonal with a strong diagonal component. FIG. 8 displays the M matrix for the FMDIS system described in FIG. 6. The similarity with the CTIS M matrix is obvious. The matrix also has a strong diagonal component and is band-diagonal. The bands are more narrowly spaced and the matrix appears more sparse. This is an indication that as expected the FMDIS matrix is singular.

Normally it would not be wise to attempt to invert a singular system, but the similarity of the above two matrices makes such an attempt inviting. Since the systems are solved in an iterative minimization fashion, a singular system will manifest itself with solutions which do not converge. The two common solutions techniques which have been successfully employed in both CTIS and FMDIS restorations are the VanCittert method, a method similar to steepest descents, and the Multiplicative Algebraic Restoration Techniques (MART) recently made popular in tomographic image restoration. Mathematically the restorations can be written as $$f^{(k+1)} = (I - \epsilon M) f^k + \epsilon g_a \quad [4]$$

and $$f_i^{k+1} = f_i^k \frac{g_{ai}}{\sum (M_{ij} f_j^k)} \quad [5]$$

These techniques have been applied to FMDIS restorations with accurate results, a surprising result given the singular nature of the M matrix. A clue as to why this can happen is given in a simple numerical experiment which can be performed with a singular FMDIS M matrix. While the matrix cannot be inverted due to its singular nature, adding a constant times the identity matrix with the constant as small as $10^{-16}$ yields a stable inverse. Investigation of the singular values of the FMDIS M matrix shows a few large values as expected (the number of spatial samples) and the rest small, notably near the numerical accuracy of the machine. Of these small values several are below the numerical accuracy and it is believed that these are the cause of the singularity. Since the solution proceeds iteratively, these few singular values do not cause divergence and it converges to an acceptable solution. Put in another way, an underdetermined set of equations has no solution because the solution is not unique. Any arbitrary solution in the null space of M may be added to the solution to form another solution. A positivity constraint is forced on the solution which may limit the nullspace, or the nullspace may perturb solutions less than would be noticeable due to the noise in this physical system. It has been found that as long as the iteration is started near the origin and forced to stay positive, the error surface converges to a stable unique point. Iterations are stopped when the foreword projection of the solution is within 1% of the measured focal plane value.

Figure 9:
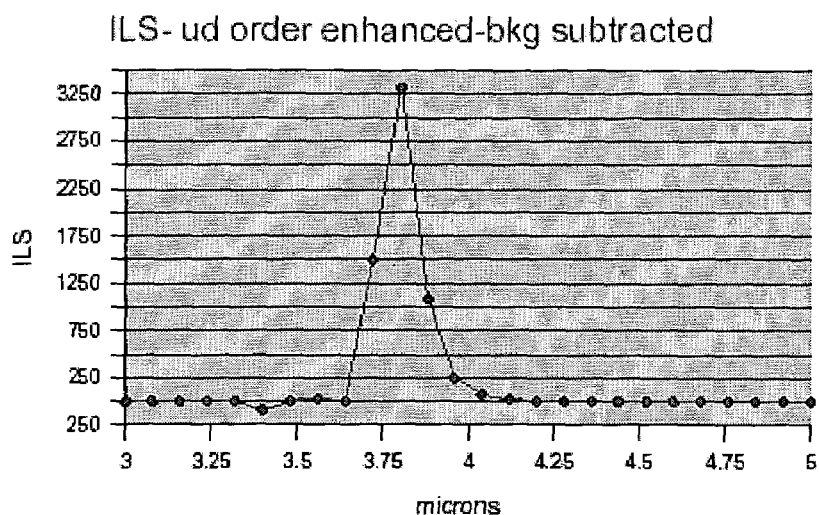
FIG. 9 displays the restoration of a point source of a single spectral wavelength using the FMDIS.

FIG. 9 displays the restoration of a point source of a single spectral wavelength using the FMDIS. As such it represents the instrument line shape (ILS) of the spectral portion of the instrument. The ILS at other wavelengths looks similar with the exception of the ILS in the 4.2 micron $CO_2$ band. The reason for this is that the calibration cannot be performed in the $CO_2$ band due to the high attenuation of the 18' path. Initially the width of the $CO_2$ band was opened almost broadband to get enough energy. These calibrations can be redone in a $N_2$ atmosphere to eliminate problems in this band. No spatial imagery will be shown since point sources are difficult to present, suffice to remark that the diffraction pattern did restore to a point source with a few low intensity artifacts in approximately 30 iterations.

Figure 10:
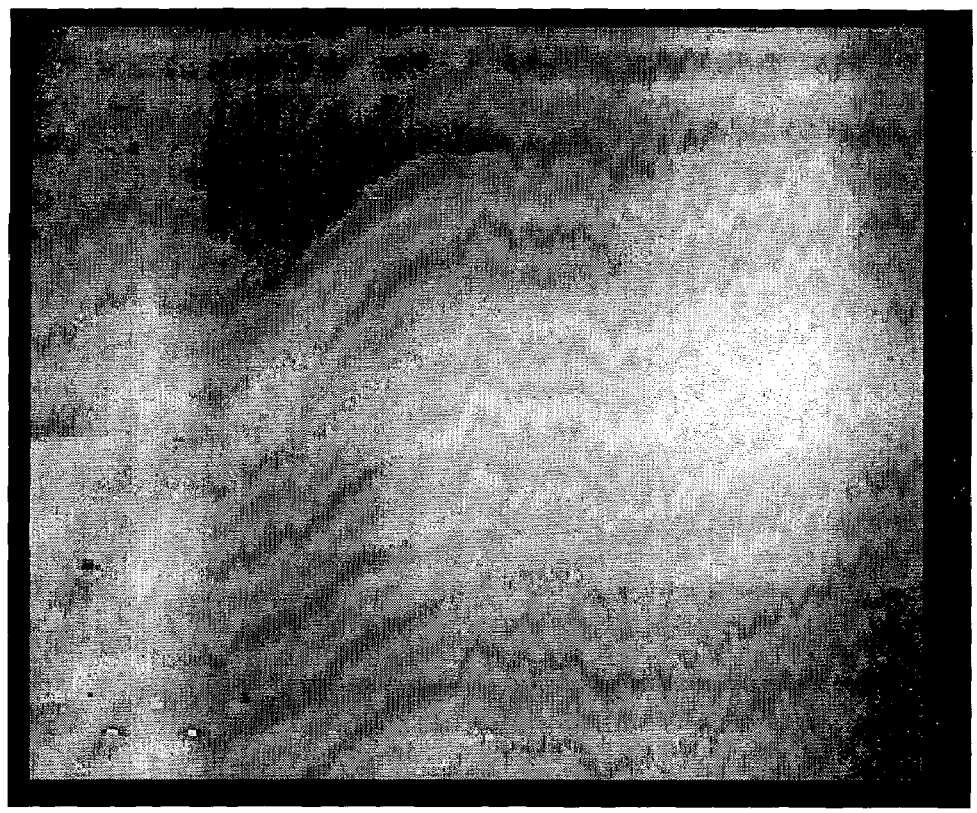
FIG. 10 displays the restored image of an example source image using the FMDIS.

FIG. 10 displays the restored image of an example source image using the FMDIS. This image is the 3.17 m band image of the front of a car. Sunglint off the windshield is seen as well as the windshield wiper. The left hand side displays the mirror and the metal runner of the rollup door. A metal fence can be seen in the background above the car roof. This image has not been corrected for FPA non-uniformity. This will be necessary in cases where the FPA must be non-uniformity corrected with the disperser in place as in this example.

A new type of imaging spectrometer has been described which eliminates several problems identified with the prior art CTIS technology. In the preferred embodiment, the new instrument employs a 256×256 pixel array and achieves imaging apertures of 150×150 pixels. This can be contrasted with the 1024×$10^{24}$ array used in the CTIS instrument with an 80×80 pixel aperture. For the new design described here, a 1024×1024 array could produce an aperture of over 900×900 pixels. Signal to noise is improved since diffraction orders are allowed to overlap. Thus the first diffraction order from one spatial location is allowed to overlap with the third diffraction order from another spatial location. This intentional overlapping of different diffraction orders is strictly forbidden in CTIS design. In this manner the signal intensity of each pixel is considerably increased over CTIS design. Likewise the high self-radiance due to the intermediate focal plane and collimation stage is eliminated since these are both not present in the new design.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A field multiplexed dispersive imaging spectrometer comprising:
   foreoptics for receiving incoming electromagnetic energy from first and second spatial locations;
   a disperser disposed to receive energy from said foreoptics and disperse said energy from said first and second spatial locations into overlapping diffraction orders;
   a focal plane array disposed to receive energy from said disperser; and
   a processor coupled to receive data from said focal plane array and execute a restoration algorithm which generates a representation of the input image in several color bands.

2. The invention of claim 1 wherein said disperser is a computer generated holographic disperser.

3. The invention of claim 1 wherein said disperser is a computer generated holographic transmission type grating.

4. The invention of claim 1 wherein said disperser produces a 5×5 diffraction pattern.

5. The invention of claim 1 wherein said disperser is designed with greater energy in the central, undiffracted order than in the other diffracted orders.

6. The invention of claim 1 wherein said disperser has 2–3 times more energy in the central, undiffracted order than in the other diffracted orders.

7. The invention of claim 1 wherein said restoration algorithm solves the equation g=Hf where f is the input image plane data, H is the system matrix, and the vector g represents the measured data from the focal plane array.

8. The invention of claim 7 wherein said input image f is solved using iterative techniques.

9. The invention of claim 8 wherein said iterative technique is the VanCittert method.

10. The invention of claim 8 wherein said iterative techniques is the Multiplicative Algebraic Restoration Techniques (MART).

11. The invention of claim 1 wherein said spectrometer further includes a field lens disposed between said disperser and said focal plane array.

12. A method for obtaining multi-spectral image measurements including the steps of:
receiving electromagnetic energy from first and second spatial locations in an input image;
dispersing said energy from said first and second spatial locations into overlapping diffraction orders using a computer generated holographic disperser;
detecting said energy; and
restoring said image using an iterative restoration algorithm.

13. A system comprising:
means for receiving electromagnetic energy from first and second spatial locations in an input image;
means for dispersing said energy from said first and second spatial locations into overlapping diffraction orders using a computer generated holographic disperser;
means for detecting said energy; and
means for restoring said image using an iterative restoration algorithm.

14. A field multiplexed dispersive imaging spectrometer comprising:
foreoptics for receiving incoming electromagnetic energy from first and second spatial locations;
a computer generated holographic disperser disposed to receive energy from said foreoptics and disperse said energy from said first and second spatial locations into overlapping diffraction orders; and
a focal plane array disposed to receive energy from said disperser.

15. A field multiplexed dispersive imaging spectrometer comprising:
foreoptics for receiving incoming electromagnetic energy from first and second spatial locations;
computer generated holographic transmission type grating disposed to receive energy from said foreoptics and disperse said energy from said first and second spatial locations into overlapping diffraction orders; and
a focal plane array disposed to receive energy from said grating.

16. A field multiplexed dispersive imaging spectrometer comprising:
foreoptics for receiving incoming electromagnetic energy from first and second spatial locations;
a disperser disposed to receive energy from said foreoptics and disperse said energy from said first and second spatial locations into overlapping diffraction orders, wherein said disperser produces a 5×5 diffraction pattern; and
a focal plane array disposed to receive energy from said disperser.

17. A field multiplexed dispersive imaging spectrometer comprising:
foreoptics for receiving incoming electromagnetic energy from first and second spatial locations;
a disperser disposed to receive energy from said foreoptics and disperse said energy from said first and second spatial locations into overlapping diffraction orders;
a focal plane array disposed to receive energy from said disperser; and
a field lens disposed between said disperser and said focal plane array.

* * * * *